United States Patent [19]

Kubota

[11] 4,193,536
[45] Mar. 18, 1980

[54] COOLING STRUCTURE FOR A CENTRIFUGE

[75] Inventor: Tokihito Kubota, Tokyo, Japan

[73] Assignee: Kabushiki Kaisha Kubota Seisakusho, Tokyo, Japan

[21] Appl. No.: 943,268

[22] Filed: Sep. 15, 1978

[30] Foreign Application Priority Data

Sep. 24, 1977 [JP] Japan ............ 52/128750[U]

[51] Int. Cl.² .................................................. B04B 15/02
[52] U.S. Cl. ................................................. 233/11
[58] Field of Search ............ 233/11, 1 R, 1 C, 26, 233/27, 1 B, 24

[56] References Cited

U.S. PATENT DOCUMENTS

| | | | |
|---|---|---|---|
| 2,699,289 | 1/1955 | Allen et al. | 233/26 |
| 2,854,189 | 9/1958 | Garrett | 233/11 |
| 3,148,146 | 9/1964 | Asnes et al. | 233/11 |
| 3,860,165 | 1/1975 | Fiedler | 233/11 |
| 3,860,166 | 1/1975 | Anderson | 233/11 |
| 4,079,882 | 3/1978 | Mizuyoshi et al. | 233/1 C |

FOREIGN PATENT DOCUMENTS 1029299 4/1958 Fed. Rep. of Germany ............ 233/11
2611679 9/1977 Fed. Rep. of Germany ............ 233/11

*Primary Examiner*—George H. Krizmanich
*Attorney, Agent, or Firm*—Pollock, Vande Sande and Priddy

[57] ABSTRACT

In a centrifuge, a rotor is housed in an inner housing and driven by a motor disposed outside thereof. By the rotation of the rotor, gas is blown off to be exhausted from the inner housing through exhaust ports formed therein, and at the same time, gas is drawn into the inner housing through an intake formed in a lid of the inner housing to cool the rotor. A guide is provided around the inner housing, by which the gas exhausted from the exhaust ports is led to one end portion of the motor to flow into the motor through holes made in a motor frame to cool the motor. The gas passing into the motor is discharged from the other end of the motor and then expelled to the outside of an outer casing of the centrifuge.

14 Claims, 7 Drawing Figures

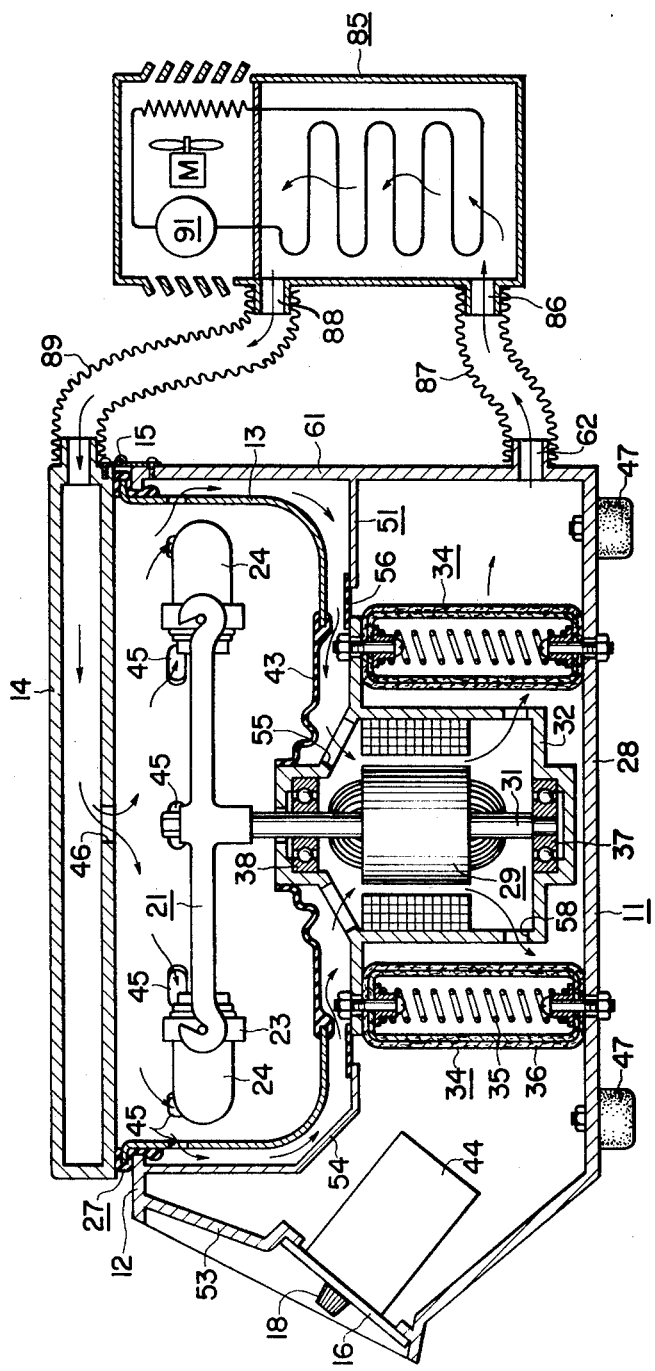

COOLING STRUCTURE FOR A CENTRIFUGE

BACKGROUND OF THE INVENTION

This invention relates to a centrifuge in which a rotor carrying a sample is driven at high speed for separation, sedimentation, concentration or the like of the sample and, more particularly, to a cooling structure adapted for suppressing a temperature rise of the centrifuge.

In a centrifuge, a rotor carrying a sample is driven at high speed, so the rotor generally generates heat due to its friction with air, and the sample is likely to be degenerated or destroyed by the heat. To avoid this, the rotor is cooled.

The simplest cooling method that has been employed in the prior art is to utilize a cooling structure in which air is blown off by the rotation of a rotor in a rotor housing and exhausted therefrom through its outlet ports to lower the atmospheric pressure in the rotor housing and, at the same time, air is drawn in from the outside through an inlet port formed in a cover of the rotor housing adjacent the position of the lowest atmospheric pressure in the rotor housing, that is, the center of rotation of the rotor, the air thus drawn into the rotor housing being similarly blown off by the revolving rotor to be forced out of the rotor housing. By such ventilation of the rotor housing, a temperature rise of the rotor is suppressed to keep the rotor at room temperature under which the centrifuge is placed.

This cooling structure achieves cooling of the rotor housing by automatically drawing air from the exterior and expelling it outside without involving a forced air supply, and hence is very convenient. But, as a motor for driving the rotor is driven at an appreciably high speed, heat is also generated from the rotor itself to heat the rotor, resulting in the likelihood of causing a temperature rise of the sample.

In view of this, it has been proposed to incorporate a fan in the motor and drive it with the rotation of the motor to draw in air to cool the motor. In this case, the additional provision of the fan inevitably makes the motor structure bulky, and since the resistance to the air supply by the fan is large, the motor itself must be designed to compensate for the resulting energy loss. Further, this method presents a problem of noise generation by the fan.

It is also possible to enlarge the outlet ports for passing air into and out of the rotor housing in large quantity to provide for enhanced cooling effect. In this instance, however, the air resistance of the rotor to the air stream markedly increases, which leads to the defect that the power of the motor used must be large correspondingly.

An object of this invention is to provide a cooling structure of simple construction for centrifuges which is designed not only to cool a rotor with gas but also to cool a motor with the gas employed for cooling the rotor.

Another object of this invention is to provide a cooling structure for centrifuges which is adapted so that air is automatically drawn into a rotor housing and then discharged therefrom to flow into a motor to cool it.

Still another object of this invention is to provide a cooling structure for centrifuges which enables cooling of a motor without attaching thereto a fan and which is of small size as a whole but of low noise.

SUMMARY OF THE INVENTION

A rotor is disposed in an inner housing mounted in an outer casing of a centrifuge. Outside of the inner housing, a motor is disposed in the outer casing for driving the rotor. By the rotation of the rotor, gas is blown off to be exhausted from the inner housing through exhaust ports formed therein, and at the same time, gas is drawn into the inner housing though an intake formed in a cover of the rotor. The gas taken into the inner housing flows past the rotor toward the exhaust ports, by which the rotor is cooled. According to this invention, in a centrifuge provided with such a cooling structure, a guide member is provided around the inner housing, by which the gas drawn off from the exhaust ports of the inner housing is led to one end portion of the motor. The gas thus guided flows into the motor through a hole formed in a motor frame at one end thereof and is exhausted from the motor through a hole made in the motor frame at the other end. In this manner, a gas passage through the motor is established. The gas exhausted from the gas passage is then expelled out of the outer casing. By passing gas into the motor of such a construction, the motor is cooled.

Moreover, there is provided a gas passage such that the gas guided by the guide member passes also on the outside of the motor to provide for further increased motor cooling effect. The gas having passed through the motor is discharged out of the outer casing, and in this case, the passage to an exhaust port of the outer casing is made long to provide for enhanced silencing effect, ensuring to prevent that noises are mixed in the gas exhausted from the outer casing.

A ring-shaped flexible plate is provided between the guide member and the motor frame, on the side of the inner housing, with either of the inner and outer marginal portions of the flexible plate fixed to the motor frame or the guide member, the other resting on the guide member or the motor frame and being urged against it by the pressure of the gas to make a gas-tight joint between the guide member and the motor frame. The rotor may be a so-called swing rotor or angle rotor, or a rotor for use with a micro-hematocrit. The gas mentioned herein may be not only air but also any other gas. Especially in the case where a cooling device is provided outside of the outer casing for cooling the exhausted gas to pass it again in the inner housing through the inlet port, gas other than air can be easily employed.

BRIEF DESCRIPTION OF THE DRAWINGS

FIG. 7 is a sectional view illustrating another embodiment of the cooling structure of this invention which employs a cooling device.

DETAILED DESCRIPTION OF THE PREFERRED EMBODIMENTS

Figure 1:
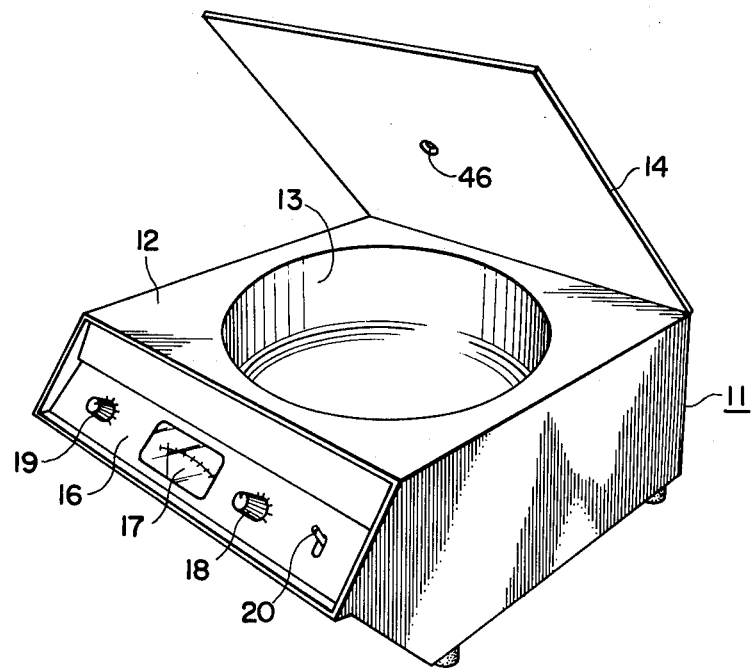
FIG. 1 is a perspective view of the external appearance of an example of a centrifuge, with its cover lifted.

Referring first to FIG. 1, there is shown an example of a centrifuge embodying this invention, with its cover lifted. A top plate 12 of an outer casing 11 has formed therein a large circular opening, through which an inner housing 13 is disposed in the outer casing 11, with the marginal flange of the inner housing 13 engaged with the marginal portion of the circular opening. A lid 14 for covering the inner housing 13 is attached to the rear edge of the top plate in a manner to be pivotal about a hinge 15.

On the front of the outer casing 11, there is provided a panel 16, at the center of which a tachometer 17 is provided, and a revolving speed regulator 18 and a timer 19 for setting the time of rotation are respectively disposed on both sides of the tachometer 17. A power supply switch 20 is also provided on the panel 16.

Figure 2:
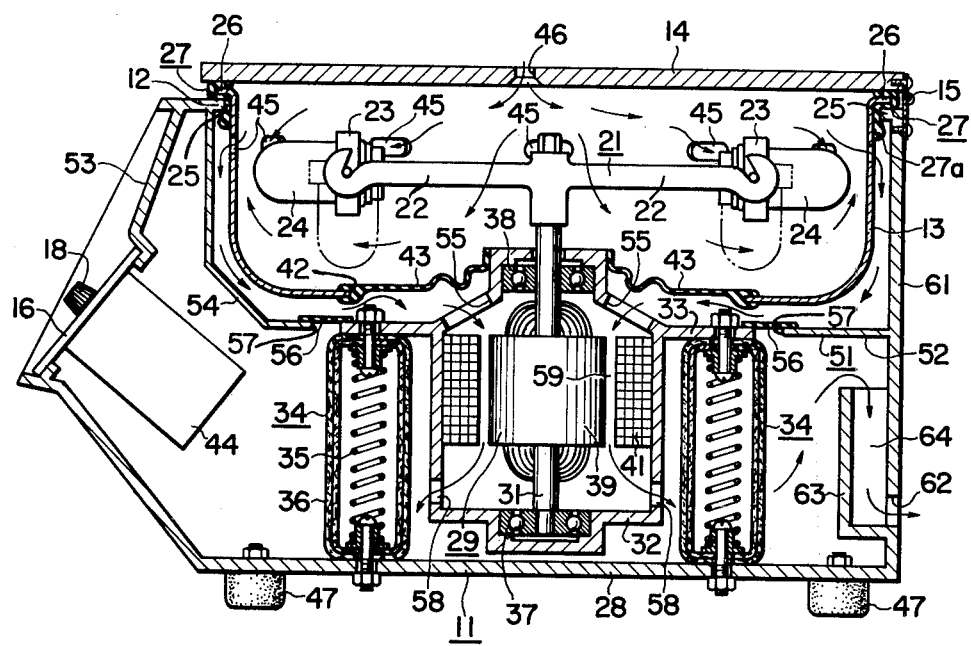
FIG. 2 is a sectional view illustrating an embodiment of the cooling structure of this invention as being applied to a centrifuge of the type employing a swing rotor.

In this centrifuge, a rotor 21 is mounted in the inner housing 13, as shown in FIG. 2. The illustrated example employs the so-called swing rotor, and its rotary shaft has attached thereto at equiangular intervals four, six, eight or more arms 22. The arms 22 each carry at its outer end a trunnion ring 23, and a bucket 24 is inserted in the trunnion ring 23 to be suspended therefrom. The rotor 21 is shown to be in its rotating state, in which the buckets 24 suspended from the trunnion rings 23 are swung up to their horizontal position by centrifugal force of the rotation of the rotor. While the rotor 21 stand still, the buckets 24 hang down, as indicated by the broken lines, and the trunnion rings 23 stay substantially horizontal with their center axes lying substantially vertical. The inner housing 13 has such a configuration that its interior surface conforms to but is spaced a little from the plane of orbit of the bottom of each bucket 24 so that the bucket 24 does not strike against the inner housing 11 during rotation and when the bucket is brought up from its vertical to its horizontal position and vice versa at the start and the end of the rotation. The inner housing 13 is disposed in the circular opening 25 which is formed nearly to the limit of the area of the top plate 12 of the outer casing 11.

In the illustrated example, the outer or upper end portion of the inner housing 13 is bent outwardly to form a flange 26, which is covered with a fixture ring 27 made of an elastic material. The fixture ring 27 is formed to extend down to the outer peripheral surface of the inner housing 13, and the marginal edge of the extending portion of the fixture ring 27 is made thick to form a ring-shaped projection 27a. The inner housing 13 is pushed into the circular opening 25 of the top plate 12 using the elastic deformation of the fixture ring 27, especially, its projection, and the inner housing 13 is installed in the outer casing 11 relatively stably by elastically holding the inner marginal edge of the circular opening 25 between the flange 26 and the projection 27a of the fixture ring 27. As occasion demands, the inner housing 13 can be removed from the outer casing 11 by pressing the fixture ring 27 to elastically deform it. The inner housing 13 is made of aluminum, for example.

A motor 29 is disposed between the bottom of the inner housing 13 and a bottom plate 28 of the outer casing 11. The motor 29 is positioned with its rotary shaft 31 extending in a vertical direction. The top end portion of the rotary shaft 31 extends into the inner housing 13, and the rotor 21 is usually detachably mounted on the rotary shaft 31. The motor 29 is supported to the outer casing 11 by the following vibration-isolating structure. A mounting plate 33, which is parallel to the bottom plate 28 of the outer casing 11, is formed unitary with a frame 32 of the motor 29 on the side of the inner housing 13. Vibration-isolating supports 34 are disposed between the mounting plate 33 and the bottom plate 28, by which the motor 29 is supported in such a manner as to minimize transmission of its vibration to the outer casing 11. The supports 34 are at least three (though four in the embodiment of FIG. 2) and disposed about the rotor shaft 31 at equiangular intervals. The supports 34 may be of the type wherein a flexible belt 36 is wound on a spring 35 around both end thereof, as disclosed in U.S. Pat. No. 4,079,882 patented Mar. 21, 1978. In order to prevent transmission of vibration of the outer casing 11, rubber legs 47 are attached to the bottom plate 28 of the outer casing 11.

In the motor frame 32, the rotary shaft 31 of the motor 29 is supported at one end, i.e. the lower end in FIG. 2, by a bearing 37 and at the other end by a bearing 38. A rotor 39 of the motor 29 is mounted on the rotary shaft 31, and a stator 41 is mounted on the inside of the frame 32 to surround the rotor 39. A bottom plate of the inner housing 13 has a centrally disposed opening 42, through which the part of the motor frame 32 covering the bearing 38 extends into the inner housing 13. The gap between the outer peripheral surface of the bearing 38 and the inner marginal edge of the opening 42 is closed by a flexible seal 43 such, for example, as a rubber sheet.

A sliding autotransformer 44 is mounted on the inside of the panel 16 at the position corresponding to a knob 18 for controlling the revolving speed of the motor 29. By controlling the sliding autotransformer 44, the revolving speed of the motor 29 can be controlled.

With the rotation of the rotor 21, the buckets 24 carried by the rotor 21 function as fan blades to blow off air to expel it from the inner housing 13 through a plurality of air outlets 45 formed in the side wall of the inner housing 13. As a consequence, the atmospheric pressure in the inner housing 13 drops, in particular, in the vicinity of the center of rotation of the rotor 21. An air inlet 46 is formed in the lid 14 of the inner housing 13 at the position adjacent the center of rotation of the rotor 21. As the atmospheric pressure in the inner housing 13 drops, air is drawn from the outside through the air inlet 46. In this case, the lid 14 makes elastic contact with the fixture ring 27 attached to the flange 26 of the inner housing 13 to maintain the inside thereof airtight with respect to the outside, so that air is taken in the inner housing 13 through the air inlet 46 only. The air outlets 45 may be elliptical holes extending in the direction of rotation of the rotor 21, as shown in FIG. 2, or may also be mere round holes. The round holes can be made more easily than the elliptical ones, but the latter makes less exhaust nois than the former. The air inlet 46 is formed at a position a little deviated from the line of the center of rotation of the rotor 21, as illustrated, so as to reduce noise generation. Also, it is desirable for less noise generation to increase the diameter of the air inlet 46 toward the inside of the lid 14, as shown, rather than to keep the diameter unchanged in the direction of thickness of the lid 14.

Figure 3:
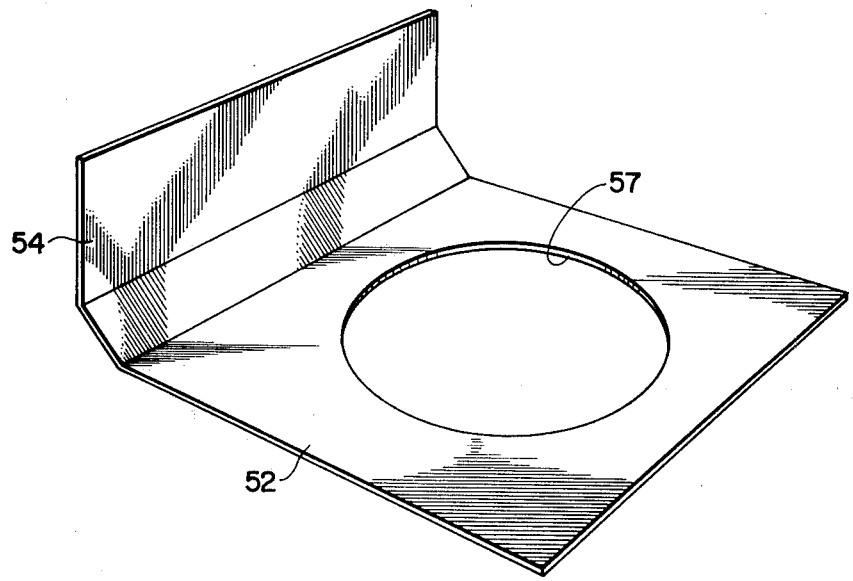
FIG. 3 is a perspective view showing one part of a guide member.

In this invention, there is provided a guide 51 around the inner housing 13 for guiding gas driven out therefrom to one end portion of the motor 29. As shown in FIGS. 2 and 3, the guide 51 is composed of a flat plate portion 52 extending inwardly from the side plate of the outer casing 11 in relatively adjacent relation to the bottom plate of the inner housing 13 and an upwardly extending portion 54 which extends up to the top plate 12 between a front plate 53 of the outer casing 11 and the inner housing 13. The flat plate portion 52, the upwardly extending porton 54 and the side plate of the outer casing 11 define the guide 51 to surround the inner housing 13. The flat plate portion 52 and the upwardly extending portion are formed, for example, by press working of an iron plate and can be attached as by welding to the outer casing 11.

The gas discharged from the inner housing 13 is led by the guide 51 to one side of the motor 29, that is, the side of its upper end. The support plate 33 of the motor frame 32 is positioned in an opening 57 formed in the flat plate portion 52. Holes 55 are made in the motor frame 12 at the junction between the bearing portion 38 and the support plate 33, so that the gas guided by the guide 51 flows into the motor frame 32. The motor frame 32 and the guide 51 are coupled together in a manner to make a gas-tight joint between them so that vibration of the motor 29 is not transmitted to the guide 51. To this end, a ring-shaped flexible plate 56 such, for example, as a rubber plate is provided on the side of the guide 51 in the present example, with the outer marginal portion of the flexible plate 56 fixed as by bonding to the marginal portion of the opening 57 made in the flat plate portion 52. The inner marginal portion of the flexible plate 56 rests on the support plate 33 of the motor frame 32 on the side of the inner housing 13 and is urged against the support plate 33 by the pressure of the gas guided by the inner housing 13 and the guide 51 to maintain gas-tightness between the motor frame 32 and the guide member 51. The requirement of this gas-tightness is not so severe, and a little gas leakage cannot be helped.

Exhaust ports 58 are formed in the motor frame 32 near bottom plate 28, so that the gas flowing into the motor frame 32 is discharged therefrom through the exhaust ports 58. In this manner, a gas passage 59 is set up in the motor frame 32.

The gas thus discharged through the exhaust ports 58 is then exhausted from the outer casing 11. The gas passage for this exhaust is made as long as possible to reduce the exhaust noise. For example, a laterally elongated hole 62 is formed in the lower portion of the rear plate 61 of the outer casing 11. A passage wall 63 parallel to the rear plate 61 is formed to be contiguous to the elongated hole 62 on the side of the bottom plate 28, and gas is discharged from the elongated hole 62 defined between the passage wall 63 and the rear plate 61.

As described above, in this example, gas taken into the inner housing 13 through the intake 46 simultaneously cools the rotor 21, the buckets 24 and samples carried therein and is exhausted from the inner housing 13 through the exhaust ports 45 and then led by the guide 51 into the motor 29 to cool it, thereafter being expelled to the outside of the outer casing 11. In this case, the force of the revolving rotor 21 blowing off the gas serves to drive it into and out of the motor 29. The flexible plate 56 mentioned above is a rubber plate, for example, 1 mm thick and forms a gas-tight joint between the motor frame vibrated by the rotation of the motor 29 and the guie 51.

Since the motor 29 is cooled as described above, a temperature rise in the centrifuge can be suppressed to lessen the bad influence on the sample. In the present example, gas can be passed into the motor 29 without attaching thereto a fan, so that the motor 29 can be formed small, i.e., the axial length of the motor 29 can be decreased about 30 mm. Further, since there is no air resistance by a fan, the load of the motor is also small, and the power of the motor can be made small. The motor 29 may be an induction motor or a commutator motor. In the case of the latter, its commutator is also cooled.

Figure 4:
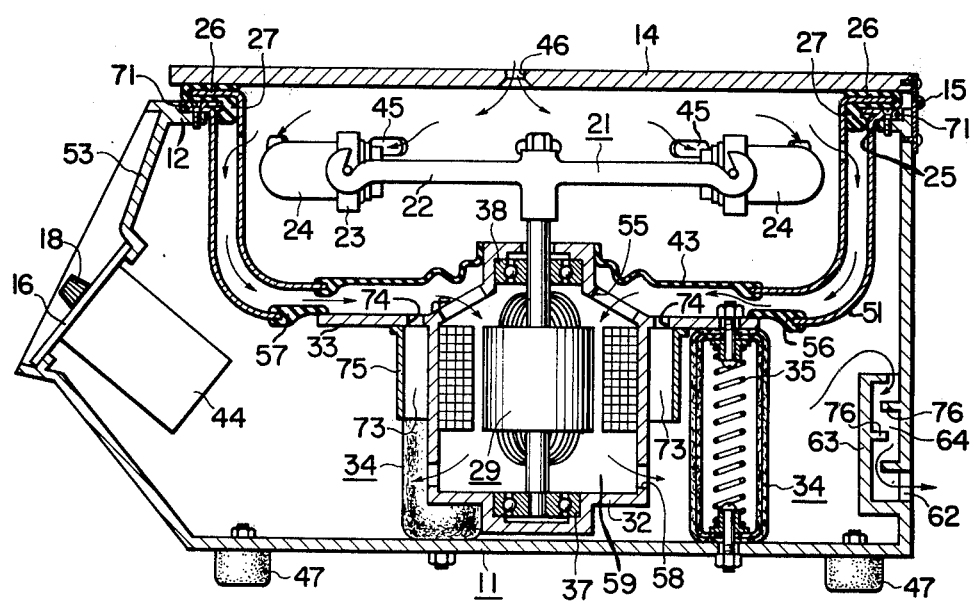
FIG. 4 is a sectional view illustrating another embodiment of the cooling structure of this invention.

It is also possible that the guide 51 is formed to be substantially similar in configuration to the inner housing 13 and provided adjacent thereto on the outside thereof, as shown in FIG. 4 in which the parts corresponding to those in FIG. 2 are identified by the same reference numerals. In this instance, the upper end portion of the guide 51 is bent outwardly and then bent back again to form a flange 71, on which is positioned the flange 26 of the inner housing 13 having attached thereto the elastic fixture ring 27. The flange 71 of the guide 51 is fixed by screws to the top plate 12 of the outer casing 11.

In the example of FIG. 4, the flexible plate 56 coupling the guide 51 and the motor 29 is shown to have fitted therein the inner marginal portion of the opening 57 but may also be bonded thereto as depicted in FIG. 2. Also in the case of FIG. 2, the flexible plate 56 may be formed to fit therein the marginal portion of the opening 57 as is the case with FIG. 4. Moreover, in the example of FIG. 4, a gas passage 73 is formed to extend along the motor 29 on the outside thereof in addition to the gas paassage 59 provided inside of the motor 29. That is, the gas guided to the upper end portion of the motor 29 is directed to the outside of the motor 29 to cool it from its outside, too. To this end, the support plate 33 of the motor frame 32 has formed therein a plurality of properly spaced small holes 74 in close proximity to the peripheral surface of the motor frame 32. Accordingly, the gas guided by the guide 51 and the inner housing 13 flows into the motor 29 through the holes 55, and at the same time, flows along the outside of the motor 29 through the holes 74. Since the passage in the motor 29 has an appreciably high air resistance, the holes 55 are made larger than the holes 74 to facilitate the air flow into the motor.

In order that the outside passage 73 may flow gas as close to the motor frame 32 as possible, a cylindrical member 75 is disposed on the outside of the motor frame 32 concentrically therewith and in close relation thereto, the upper end of the cylindrical member 75 being fixed to the support plate 33. Between the cylindrical member 75 and the motor frame 32 is defined the outside passage 73 to cool the motor frame 32 from the outside thereof. Also in the example of FIG. 2, the outside gas passage 73 may similarly be provided and, of course, this passage 73 may also be omitted in the example of FIG. 4.

In FIG. 4, three motor supports 34 are employed, but one of them is illustrated. In the example of FIG. 2, four supports 34 are provided, and the number of supports 34 can be selected at will. Further, in an exhaust passage 64 for guiding the exhausted gas to the outside of the outer casing 11, laterally extending ribs 76 are provided on the rear plate 61 and the passage wall 63 alternately with each other in the vertical direction so that the gas flowing into the exhaust passage 64 follows a zigzag course. Namely, the exhaust passage 64 is made longer to ensure further reduction of the exhaust noise. But the exhaust passage 64 may also be of the same construction as shown in FIG. 2.

Where the guide 51 is made similar to configuration to the inner housing 13, the guide passage defined between them facilitates the gas flow. For example, in FIG. 2, gas is likely to swirl at the corner of the junction between the first plate portion of the guide 51 and the rear plate 61 and does not flow smoothly, resulting in the cooling effect being lessened. In the example of FIG. 4, however, the flow of gas is smooth to heighten the cooling effect. But the manufacturing cost of the guide 51 shown in FIG. 4 is a little higher than in the case of FIG. 2.

Figure 5:
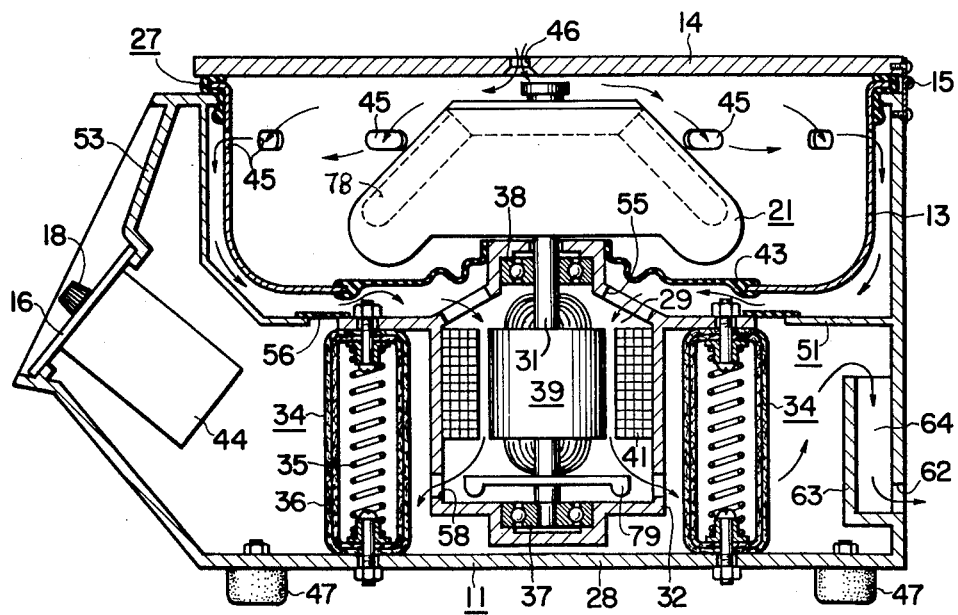
FIG. 5 is a sectional view showing another embodiment of the cooling structure of this invention as being applied to a centrifuge employing an angle rotor.

This invention is applicable not only to a centrifuge employing a swing rotor but also to a centrifuge using a so-called angle rotor. FIG. 5 illustrates another embodiment of this invention as being applied to a centrifuge employing an angle rotor. The angle rotor, identified by 21, is made, for example, from a block of a metal in a manner to have a conical configuration, and sample tubes 78 are inserted in holes made in the rotor 21 to extend along the peripheral surface of the conical structure obliquely to its axis. With the rotation of the rotor 21, gas is blown off outwardly owing to the viscous resistance of the gas and forced out from the inner housing 13 through the exhaust ports 45, and at the same time, gas is taken into the inner housing 13 through the intake 46. The gas flowing out of the inner housing 13 is guided by the guide 51 into the motor 29.

Further, in the example of FIG. 5, a fan 79 is affixed to the rotary shaft 31 between the thrust bearing 37 and the rotor 39 of the motor 29 so as to further improve the flow of gas. The fan 79 rotates with the rotation of the motor 29, by which gas introduced into the motor 29 from the holes 55 of the motor frame 32 is forcedly driven out of the motor frame 32 through the exhaust ports 58. In the case of the angle rotor, when its revolving speed is relatively low, the force for driving out gas into the motor only with the rotation of the rotor 21 is small in some cases. But the cooling effect can be enhanced by the employment of the fan 79. Of course, the fan 79 may be omitted, and also in the example of FIG. 4, the fan can be used to further heighten the cooling effect. Moreover, the guide 51 can also be formed to have the same construction as that utilized in FIG. 4.

Figure 6:
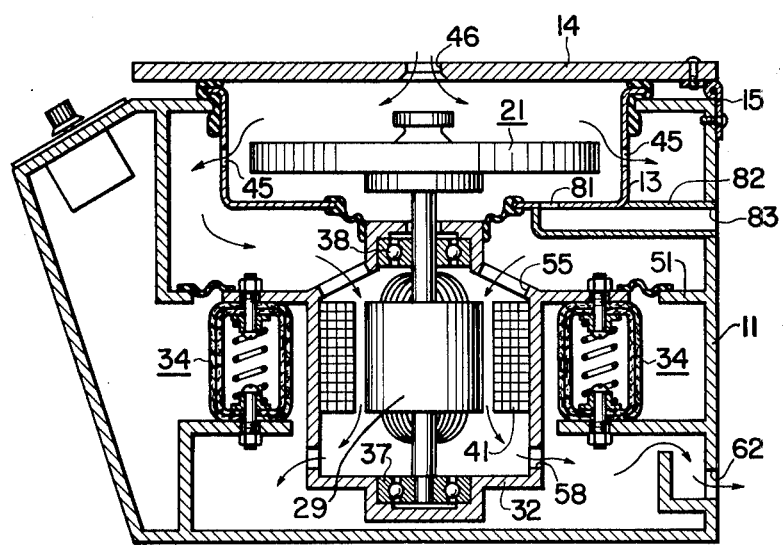
FIG. 6 is a sectional view showing another embodiment of the cooling structure of this invention as being applied to a centrifuge employing a rotor for a hematocrit.

Another embodiment of this invention is illustrated in FIG. 6 in which a rotor for the hematocrit use is employed. This rotor 21 is disc-shaped, and capillary tubes containing blood are mounted on the rotor 21 to lie radially thereof. In this instance, the rotor 21 is driven at relatively high speed, so that air in the inner housing 13 is blown off due to the viscosity of air strongly enough to be sufficiently driven out of the inner housing 13, thereafter being guided by the guide 51 to flow into the motor 29.

In this example, a plurality of air inlets 81 are formed in the bottom plate of the inner housing 13 near the rotary shaft of the rotor 21 in addition to the intake 46 of the lid 14. The air inlets 81 each communicate with a hole 83 made in the side plate of the outer casing 11 through a guide pipe 82 provided between the underside of the inner housing 13 and the guide 51, so that air drawn into the guide pipe 82 from the hole 83 is introduced into the inner housing 13 through the air inlet 81. The air thus introduced into the inner housing 13 flows under the disc-shaped rotor 21 in the radial direction thereof and is guided to flow out of the inner housing 13 through the exhaust ports 45.

It is also possible to provide a cooling device on the outside of the outer casing 11 and supply cooled air into the inner housing 13. FIG. 7 shows another embodiment of this invention employing such a cooling device. A cooling device 85 is disposed on the outside of the outer casing 11, and the exhaust port 62 of the outer casing 11 and an inlet 86 of the cooling device 85 are coupled with each other by a flexible pipe 87. Cooled air from an outlet 88 of the cooling device 85 is led to the intake 46 through a flexible pipe 89. In the present example, the lid 14 is hollow, and the pipe 89 is led into the space of the hollow lid 14, the intake 46 being formed in the lower plate of the lid 14, as shown. The cooling device 85 may be a usual one which compresses gas by means of the so-called compressor 91 to evaporate the gas in a moment and cools air by the evaporation heat. It is also possible to use a cooling device of the type utilizing a cooling water. The air exhausted from the outer casing 11 is supplied into the cooling device 85 through the pipe 87 and cooled, thereafter being supplied to the side of the intake 46.

Even in the case where the cooling device 85 is provided as described above, air circulation can be achieved by the action of exhausting air from the inner housing 13 with the rotation of the rotor 21. But, if necessary, a fan 79 may also be provided in the motor as shown in FIG. 5, to further facilitate the air flow. With such an arrangement, temperature in the inside of the inner housing 13 can be reduced lower than room temperature. Further, the circulating gas is made independent of the outside, so that the gas may be not only air but also an inert gas, for example. Moreover, in the case of such a closed structure, as noises are not transmitted to the outside so much, the silencing structure need not always be provided. It is apparent that various modifications can be effected such that the guide 51 is formed in the same manner as shown in FIG. 4 and that the rotor 21 is replaced with the angle rotor, the rotor for the hematocrit use or the like. The flexible plate 56 between the guide 51 and the motor 29 need not always be fixed at the inner marginal portion to the guide 51 but may also be fixed at the inner marginal portion to the motor frame, with the outer marginal portion merely resting on the guide 51. This may also be applied to the other embodiments.

It will be apparent that many modifications and variations may be effected without departing from the scope of the novel concepts of this invention.

What is claimed is:
1. A cooling structure for a centrifuge comprising:
an outer casing;
an inner housing mounted in the outer casing;
a rotor disposed in the inner housing;
a motor comprising a motor frame disposed in the outer casing under the inner housing, said motor including a shaft for driving the rotor;
exhaust ports formed in the peripheral wall of the inner housing for exhausting therefrom gas blown off by the rotation of the rotor;
a lid covering the inner housing and having an intake for drawing gas into the inner housing as gas is exhausted from said inner housing through said exhaust ports;
a guide provided around the inner housing for guiding the gas exhausted from the exhaust ports to the upper end of the motor; and means defining a gas passage through said motor for passing the gas guided to the upper end of the motor into the motor through holes made in said motor frame adjacent the upper end thereof and exhausting the gas from the motor through holes made in said motor frame adjacent the lower end thereof.

2. A cooling structure for a centrifuge according to claim 1, further including an exhaust passage for exhausting the gas from the gas passage to the outside of the outer casing.

3. A cooling structure for a centrifuge according to claim 2, wherein the exhaust passage is constructed to reduce the exhaust noise.

4. A cooling structure for a centrifuge according to claim 1, wherein the guide is composed of a flat plate portion adjacent the bottom of the inner housing, the upper parts of side and rear plates of the outer casing and an extension of the flat plate portion at its front edge which extends therefrom between a front plate of the outer casing and the inner housing.

5. A cooling device for a centrifuge according to claim 1, wherein the guide is similar in configuration to the inner housing and disposed close to the inner housing on the outside thereof.

6. A cooling structure for a centrifuge according to claim 1, wherein the guide and the motor frame are coupled with each other by flexible coupling means.

7. A cooling structure for a centrifuge according to claim 6, wherein the flexible coupling means is a ring-shaped flexible plate which has one marginal portion fixed to the guide or the motor frame and the other marginal portion resting on the side of the inner housing and urged against the motor frame or the guide by the pressure of the gas guided by the guide.

8. A cooling structure for a centrifuge according to claim 1, further including means defining an outside gas passage for directing a portion of the gas guided to the upper end of the motor to flow along the outside of the motor.

9. A cooling structure for a centrifuge according to claim 1, wherein the motor is a swing rotor.

10. A cooling structure for a centrifuge according to claim 1, wherein the rotor is an angle rotor.

11. A cooling structure for a centrifuge according to claim 1, wherein the rotor is a disc-shaped rotor for hematocrit use.

12. A cooling structure for a centrifuge according to claim 11, further including means defining a gas passage for drawing gas into the inner housing from the outside of the outer casing through the bottom of the inner housing.

13. A cooling structure for a centrifuge according to claim 1, further including a cooling device which is supplied with the gas exhausted from the gas passage to cool said gas and which supplies the cooled gas to the intake.

14. A cooling structure for a centrifuge according to claim 1, further including a fan attached to the motor for exhausting the gas in the gas passage.

* * * * *